Patented Feb. 12, 1946

2,394,742

UNITED STATES PATENT OFFICE 2,394,742

CASTOR OIL PRODUCTS AND PREPARATION OF SAME

Franklin A. Bent, Berkeley, and Clyde R. Ryan, Albany, Calif., assignors to Shell Development Company, San Francisco, Calif., a corporation of Delaware No Drawing. Application November 24, 1942, Serial No. 466,811

14 Claims. (Cl. 260—23)

This invention relates to a process for the production of novel products from castor oil. More particularly, the invention pertains to a method of obtaining castor oil products which are especially suitable as varnish oils.

Castor oil is recognized and classified in the art as a non-drying oil. It is known that by subjecting the oil to a suitable treatment, chemical dehydration of hydroxylated fatty acid glycerides in the oil occur and a highly unsaturated oil is obtained which has drying properties. The dehydrated castor oil has been used in various varnishes, paints and coating compositions. For many purposes, however, the dehydrated castor oil after drying or even baking lacks sufficient hardness and chemical resistance to be entirely suitable. Furthermore, while varnishes can be prepared from the dehydrated castor oil, the properties of the surface films obtained from these varnishes are not satisfactory for many applications. In general, short oil varnishes containing tung oil or similar oils, yield films which dry rapidly and are both hard and tough. However, varnishes prepared from dehydrated castor oil, even when of short oil length, do not give surface films which are of sufficient hardness for many applications.

It is therefore an object of the present invention to provide a varnish oil prepared from castor oil which when used as a varnish ingredient will enable preparation of varnishes yielding surface films of satisfactory hardness, toughness, flexibility and resistance to chemical agents.

Another object is to provide a novel and highly useful product from castor oil.

A further object is to provide a product from castor oil having drying properties and the ability to form a hard, resistant film when subjected to a baking treatment.

A still further object is to provide a simple and economical process for preparing such novel products from castor oil.

Other objects will be apparent from the description of the invention given hereinafter.

We have discovered that by heating castor oil in admixture with one of a certain class of unsaturated alcohol esters of polybasic acids, while in the presence of a dehydration catalyst so that dehydration of the castor oil with simultaneous heat bodying of the mixture is effected, gives a product especially suitable as a varnish oil. The chemical structure of the product is not at present understood. The product may be a true copolymer of the unsaturated ester and the dehydrated castor oil or perhaps it is composed of polymers of castor oil which are known to form when castor oil is subjected to dehydration and heat bodying, which polymers are, in effect, mechanically interlocked with the three dimensional polymers of the unsaturated ester or, and probably most likely, the product is a complex combination of these or other structures.

Regardless of its chemical structure, the product has drying properties and excellent baking qualities as well as being a varnish oil from which both long and short oil varnishes may be prepared which yield surface films that are hard, while at the same time being tough, flexible and resistant to chemical agents. Furthermore, varnishes prepared from these products have much shorter drying times than those wherein dehydrated castor oil is used as the varnish oil. The ability of our product to be utilized in the manufacture of short oil length varnishes from which hard surface films are obtainable distinguishes it from castor oil. Further, the hardness of the final film may be suitably varied by variation in the type and proportion of the unsaturated ester used in admixture with the castor oil in the dehydration and heat bodying of this mixture. The varnish oil product of the invention obtained by dehydration of the castor oil therein with accompanying heat bodying of the mixture is different in characteristics and quality from the product obtained by heating separately dehydrated castor oil with the unsaturated esters. The product of the invention also differs from that obtained by heating the unsaturated ester with castor oil in the absence of a dehydration catalyst, whereby no dehydration occurs during the preparation of the product. Such a product lacks the valuable property of being compatible with aliphatic hydrocarbon solvents and thinners, while our product is compatible therewith.

The heat treatment to which the mixture of castor oil and unsaturated ester containing a dehydration catalyst is subjected according to the process of the invention causes the castor oil to undergo dehydration, while heat bodying of the reaction mixture is also effected. While the dehydration and heat bodying are separate functions of the process, there is no distinct break between them. Upon heating the mixture of components, water is given off from the dehydration reaction during the first part of the heating period, but decreases in amount as the heating is continued and the bodying operation is performed. It is believed that the simultaneous dehydration reaction and heat bodying reactions are responsible for the unique properties of the product obtained by the method of the invention.

The unsaturated alcohol esters of polybasic acids employed in admixture with the castor oil are esters of unsaturated alcohols which have olefinic linkage between two carbon atoms, one of which is linked directly to a saturated carbon atom having the hydroxyl group linked directly thereto. The simplest alcohol having this essential structure is allyl alcohol. The polybasic acids from which the esters are derived are either inorganic or carboxylic acids and the polycarboxylic acids are aliphatic or aromatic in character. Among representative compounds of the class of esters used in the invention are diallyl carbonate, diallyl oxalate, dimethallyl oxalate, diallyl succinate, diallyl adipate, dimethallyl carbonate, dimethallyl succinate, dimethallyl adipate, diallyl phthalate, diallyl maleate, diallyl terephthalate, diallyl diglycollate, triallyl citrate, di (beta-chlorallyl) succinate, di (beta-chlorallyl) phthalate, di (methyl vinyl carbinyl) adipate, di (methyl vinyl carbinyl) phthalate, dicrotyl mesaconate, dicrotyl phthalate, dicinnamyl glutarate, dicinnamyl phthalate, triallyl borate, triallyl phosphate, trimethallyl borate, tricinnamyl phosphate and the like. The preferred compounds are those esters from unsaturated alcohols having an unsaturated terminal methylene group linked directly by a double bond to a carbon atom which in turn is linked directly to the carbinol group, the carbon atom thereof being saturated. It is also preferred that the esters be derivatives of aromatic polycarboxylic acids. Specifically, the most preferred compounds are allyl esters of polycarboxylic acids and of these, the particularly desirable compound is diallyl phthalate.

The unsaturated esters used in the process of the invention are neutral esters—i. e. each and all of the carboxyl or acid groups have been esterified. For a particular compound, all of the acid groups are ordinarily esterified with a single unsaturated alcohol, but if desired, several different alcohols may be used. Reference is made to mixed esters such as, for example, allyl methallyl phthalate, allyl cinnamyl adipate, dimethallyl crotyl borate and the like. It is only necessary that the ester contain a plurality of unsaturated alcohol radicals linked to the acid residue. In some cases with esters of tri or higher polybasic acids, it is useful to have present a saturated group to obtain modification of the properties of the product such as with compounds of the type like diallyl monobutyl citrate.

In preparing the valuable products according to the process of the invention, a mixture of castor oil and the unsaturated ester is heated at a temperature whereby dehydration of the castor oil is effected. While the operation can be effected in an open container, it is preferred to conduct the heating in a closed vessel fitted with a reflux condenser and a customary device for collecting distillate which is principally water. With such an arrangement, the amount of water evolved and collected is indicative of when the theoretical amount of water is obtained by dehydration of the castor oil. If desired, the vessel may also be fitted with means for agitating the contents.

The mixture is heated at a temperature whereby the dehydration of the castor oil occurs. This is effected in the range of from 150 to 350° C. and preferably at from 200 to 300° C. Excellent results are obtained by heating the mixture to a temperature of from about 220 to 240° C. during the first part of the treatment and maintaining such a temperature until the water formed by dehydration decreases in quantity, whereupon the temperature is increased to hasten the bodying operation. The heat bodying and final dehydration of the mixture is preferably conducted at a temperature of from 260 to 300° C. while the use of a temperature of about 285° C. is particularly suitable for this phase of the treatment. Although the preferable mode of operation as stated above involves treatment at two temperatures, the process can be conducted at a single temperature. It is only necessary that the temperature be sufficient whereby dehydration of the castor oil occurs. Temperatures so high that appreciable decomposition of the oil occurs are of course to be avoided. It is, however, to be noted that the treatment of the invention may yield minor quantities of the anhydride or free acid from the unsaturated ester employed in the process, as well as very small amounts of aldehydes and permanent gas. The treatment may also vaporize some amounts of the unsaturated ester used in the process. When operating with lower boiling members of the class of unsaturated esters, it is desirable that sufficient pressure be employed in the heat operation so that the ester contained in the mixture does not boil. To prevent boiling of the ester, it is evident that in some cases superatmospheric pressures are desirably employed. When high boiling unsaturated esters are employed in admixture with the castor oil, it is sometimes advantageous to operate at subatmospheric pressure for the purpose of assisting removal of water formed by dehydration of the castor oil, the choice of the reduced operating pressure being such, of course, as to not be so low that the unsaturated ester will be removed with the water of dehydration. Passing or bubbling an inert gas such as nitrogen, carbon dioxide, helium, etc., through the reaction mixture also assists the removal of water and can be used with the system at either normal, superatmospheric or subatmospheric pressure and has the advantage in some cases of affording a lighter colored product.

The processing of the mixture of castor oil and unsaturated ester is effected in the presence of a dehydration catalyst. By a dehydration catalyst, reference is made to those substances known to catalyze the dehydration of organic hydroxy compounds. These substances catalyze the dehydration of the castor oil under the conditions of the treatment. The alkali metal acid sulfates (NaHSO4, KHSO4, etc.) are a preferred class of dehydration catalyst with hydrated sodium bisulfate being particularly suitable. Other representative dehydration catalysts include bentonite, p-toluene sulfonic acid, tungsten trioxide, phosphorus pentoxide, phosphoric acid, sulfuric acid, boron oxide, molybdenum oxide, kaolin, ammonium acid sulfate, copper sulfate, aluminum sulfate, ferric sulfate, potassium alum, ferric ammonium alum, phthalic anhydride, maleic anhydride, etc. The quantity of catalyst to be employed in the process is determined by the activity of the particular catalyst with the preferred catalyst, hydrated sodium acid sulfate, as little as 1% based on the castor oil, gives excellent results. With less active catalysts such as sulfuric acid, as little as .1% is employed. Sodium acid sulfate is an excellent material for use as a dehydration catalyst, because of its high activity and the ease with which it may be separated from the reaction mass upon completing the simultaneous heating and dehydrating treatment. The separation is effected readily with this substance, owing to its insolubility in the reaction mass and ability to settle therein. In general, the dehydration catalyst is separated from the reaction mass by decantation. An additional advantage obtained in using sodium acid sulfate as the dehydration catalyst is the excellent color of the product prepared with this substance as compared to that when other substances such as acids are employed which tend to give a darker colored product.

As the time of heating progresses in the process of the invention, the viscosity of the reaction mixture increases and it may be made to vary from a rather thin liquid to one which is very viscous. In general, the heating is continued until the product acquires a viscosity of about Z on the Gardner-Holdt scale. Excellent varnishes are obtained when the heat bodying is continued until a viscosity of Z5 to Z6 is obtained.

The character of the product may be varied by choice of proportion of castor oil to unsaturated ester used in the preparation. In this respect the proportion may be varied over wide limits, but in general the amount of either castor oil or the unsaturated ester is kept to at least 10% of the weight of the mixture. By increasing the amount of unsaturated ester in the mixture, the product when dried or baked or the film from a compounded varnish of the product becomes harder in character, preferably the amount of castor oil or unsaturated ester is at least 15% of the mixture. Excellent results are attained with a mixture of equal parts of castor oil and unsaturated ester as well as with 85% unsaturated ester and 15% castor oil. In some cases it is desirable to employ a plurality of unsaturated esters in admixture with the castor oil in preparing the product.

The product of the invention is used in the manufacture of varnishes in a similar manner to that of other drying oils. Thus the product is cooked with a synthetic or natural resin, care being taken in the rate of heating as well as the time the mixture is maintained at the maximum temperature of the cook, such procedures and precautions being well known in the varnish making art. A variety of resins may be used in manufacturing varnishes from the varnish oil product of the invention. Excellent varnishes are obtained from our varnishes with maleic alkyd resins including rosin modified alkyd resins. Examples of other resins used in preparing the varnishes include ester gum, alkyd resins, modified alkyd resins, phenolic resins, modified phenolic resins, rosin modified urea-aldehyde resins, coumarone-indene resins, malamine urea-formaldehyde resins, rosin and rosin derivatives like polymerized and partially hydrogenated rosin, as well as other synthetic and natural resins customarily used in making varnishes.

In preparing varnishes from dehydrated castor oil, the use of substances derived for example, from fish oil which are known to the trade as neofats must necessarily be incorporated to prevent gelling and increase compatibility of the varnish components. The varnish oil of the present invention, on the other hand, does not require such added ingredients to prevent gelling and this lack of gelling characteristics is of advantage as compared to dehydrated castor oil. The varnishes are cut with mineral thinners or other hydrocarbons and contain dryers such as lead, cobalt or manganese, lineolates, resinates, or naphthenates or mixtures thereof to aid the rate of hardening of a film of the varnish applied to a surface. Excellent varnishes both of short oil length as well as long oil length are obtained from the new product. Stains or dyes may be added to the varnish for coloring the same. Enamels may of course be prepared by incorporating suitable pigments into the varnish.

While the product of the invention is particularly suitable as a varnish base oil, it may be utilized alone or in combination with plasticizers, etc., as the resinous component of coating compositions. It may be thinned to a suitable viscosity with naphtha and especially when less than about 80% unsaturated ester is used in the original mixture to make the product, aliphatic hydrocarbon thinners may be used. Such thinned compositions, to which are added either separately or with the thinner, lead, cobalt and/or manganese dryers, bake at 100 to 250° C. to hard, tough, resistant films. Pigments, plasticizers and other materials may be incorporated into the compositions if desired.

The following examples are given for the purpose of further illustrating the invention, it being understood that the invention is not to be construed as limited to details given therein.

EXAMPLE I

A mixture containing 250 grams of diallyl phthalate and about 250 grams of raw castor oil to which was added 3 grams of $NaHSO_4 \cdot H_2O$ was heated at a temperature of 250° C. to 260° C. in a closed vessel fitted with means for collecting the distillate. About 13½ cc. of water was collected (theory 14 cc.) and also an oily layer amounting to about 4½ cc. The mixture was heated until the viscosity of Body Y (Gardner-Holdt) was obtained. The product was decanted from the dehydration catalyst.

A portion of the product was dissolved in a hydrocarbon thinner and the composition was applied to a tinned panel which was dried at 250° F. for one hour. A loss of weight amounting to 12½% of the product occurred.

EXAMPLE II

For purposes of comparing the product of Example I with a product made from dehydrated castor oil, a mixture containing 250 grams of diallyl phthalate and 250 grams of dehydrated castor oil was heated at 255° C. About 15 minutes' time was taken to reach this temperature at which the mixture was maintained for 161 minutes. This treatment increased the viscosity of the product to a Body Z4-Z5 (Gardner-Holdt).

As in Example I, the coating composition was prepared from the product, applied to a tin panel, and dried at 250° F. for one hour. The loss of weight caused by this treatment amounted to 22.2% or nearly 100% greater than that of the product of Example I.

EXAMPLE III

A mixture of 250 grams of raw castor oil and 250 grams of diallyl phthalate was heated in the presence of 2.5 grams of $NaHSO_4 \cdot H_2O$. The mixture was kept at a temperature of 280 to 285° C. for about 69 minutes which caused the body to become somewhat greater than Z6 (Gardner-Holdt). This product was used to make varnishes as described in the following examples.

Example IV

Varnishes at 19 gallon and 50 gallon oil lengths were prepared from a maleic alkyd resin (Teglac Z-152) and the heat reacted and body mixture of castor oil-diallyl phthalate according to the following procedure: 100 grams of resin were heated with 160 grams of varnish oil at a rate taking 19 minutes to reach 520° F. The cook was held at this top temperature for 10 minutes, and resulted in a clear, excellent varnish giving a good film with high gloss and pale color when cut to Body B with an aromatic thinner. This varnish air dried to a dry, tack-free film in about 7½ hours. After 5 days air drying, the film obtained had a Sward Hardness of 50 (glass=100). The 50 gallon oil length varnish was prepared by heating a mixture containing 25 grams of resin and 104 grams of varnish oil. About 15 minutes were taken to heat to 520° F. and the temperature held at this point for 10 minutes. To the product was added 145 grams of a hydrocarbon varnish thinner. This varnish also gave a film of high gloss and pale color which had a Sward Hardness of 38.

Example V

An attempt was made to prepare a varnish similar to that described in Example IV, except that dehydrated castor oil was used as the varnish oil. A mixture of 100 grams of resin (Teglac Z-152) and 160 grams of dehydrated castor oil was heated at a rate occupying 91 minutes to reach 580° F. which was held for 5 minutes. The mixture gelled so that it could not be applied as a varnish, even though the high cooking temperature was used. Similarly, a mixture of the same components, but in a proportion of 50 gallon oil length was heated at a rate taking 12 minutes to reach 570° F. which was held for 13 minutes, whereupon the mixture also gelled.

Example VI

Experiments were made to compare the properties of ester gum varnishes made using the heat body castor oil-diallyl phthalate mixture with similar varnishes made using dehydrated castor oil.

(A) A mixture containing 100 grams of ester gum and 160 grams of castor oil-diallyl phthalate varnish oil was heated in 13 minutes to 450° F. at which point the temperature was maintained for 15 minutes. The varnish was cut to Body B with an aliphatic hydrocarbon thinner and applied to a panel where it air-dried to a dry, tack-free film.

(B) A mixture of 100 grams of ester gum and 160 grams of dehydrated castor oil was heated in 14 minutes to 450° F., this maximum temperature being held for about 15 minutes. The varnish was cut with an aliphatic hydrocarbon thinner and applied to a panel for air drying.

(C) A mixture of 25 grams of ester gum and 104 grams of castor oil-diallyl phthalate varnish oil was heated in 9 minutes to 450° F., the temperature being held there for 15 minutes. This varnish was also thinned to Body B with the aliphatic hydrocarbon thinner.

(D) A mixture of 25 grams of ester gum and 104 grams of dehydrated castor oil was heated in 9 minutes to 450° F. at which point it was held for 16 minutes. This mixture was similarly thinned, applied to a panel and air dried.

A comparison of the drying times and hardness of the finished films is indicated in the table below which clearly points out the superiority of the product of the invention over dehydrated castor oil for use as a varnish oil.

*Properties of varnishes made from ester gum*

| Number | Oil ingredient | Oil length | Time to tack free dryness by air drying | Sward hardness after 5 days air drying |
|---|---|---|---|---|
| (A) | Castor oil-diallyl phthalate blend. | 19 | 6¼ hrs | 40 |
| (B) | Dehydrated castor oil. | 19 | 46 hrs | 20 |
| (C) | Castor oil-diallyl phthalate blend. | 50 | 23 hrs | 29 |
| (D) | Dehydrated castor oil. | 50 | Still tacky after 48 hrs. | 4 |

We claim as our invention:

1. A process for the production of a product suitable as a varnish oil which comprises heating a mixture consisting of castor oil and a neutral ester of a mono-olefinic monohydric alcohol and a polybasic acid, said alcohol having an olefinic bond between two carbon atoms, one of which is linked directly to a saturated carbon atom having the hydroxyl group linked directly thereto, and said heating being effected in the presence of a dehydration catalyst and at a temperature whereby dehydration of the castor oil occurs.

2. A process as claimed in claim 1 wherein the heating is effected at a temperature of from 150° C. to 350° C.

3. A process for the production of a product suitable as a varnish oil which comprises heating a mixture consisting of castor oil and a neutral allyl ester of a polybasic acid, said heating being effected in the presence of a dehydration catalyst and at a temperature whereby dehydration of the castor oil occurs, but below that at which appreciable further decomposition of the constituents of the reaction mixture is effected.

4. A process as claimed in claim 3 wherein the neutral allyl ester of a polybasic acid is a diallyl ester of a dicarboxylic acid.

5. A process as claimed in claim 3 wherein the heating is effected with the mixture in the presence of an alkali metal bisulfate catalyst and wherein the neutral allyl ester of a polybasic acid is a diallyl ester of a dicarboxylic acid.

6. A process for the production of a product suitable as a varnish oil which comprises heating a mixture consisting of castor oil and diallyl phthalate in the presence of a dehydration catalyst and at a temperature whereby dehydration of the castor oil occurs, but below that at which further appreciable decomposition of the constituents of the mixture is effected.

7. A process for the production of a product suitable as a varnish oil which comprises heating a mixture consisting of castor oil and diallyl phthalate at a temperature between 150° C. and 350° C. whereby dehydration of the castor oil occurs, said heating being effected in the presence of a dehydration catalyst.

8. A process for the production of a product suitable as a varnish oil which comprises heating a mixture consisting of castor oil containing from 25 to 90 per cent by weight of diallyl phthalate in the presence of sodium acid sulfate and at a temperature between 150 and 350° C. whereby dehydration of the castor oil occurs.

9. A process for the production of a product suitable as a varnish oil which comprises heating a mixture consisting of castor oil and diallyl phthalate to which has been added about 1% by weight based on the castor oil of $NaHSO_4 \cdot H_2O$.

said heating being effected between about 200 and 300° C. whereby dehydration of the castor oil occurs.

10. A product suitable as a varnish oil comprising a dehydrated and heat-bodied mixture consisting of castor oil and a neutral ester of a mono-olefinic monohydric alcohol and a polybasic acid, said alcohol having an olefinic bond between two carbon atoms, one of which is linked directly to a saturated carbon atom having the hydroxyl group linked directly thereto.

11. A product suitable as a varnish oil comprising a simultaneously dehydrated and heat-bodied mixture consisting of castor oil and a neutral ester of a mono-olefinic monohydric alcohol and a polycarboxylic acid, said alcohol having an olefinic bond between two carbon atoms, one of which is linked directly to a saturated carbon atom having the hydroxyl group linked directly thereto.

12. A product suitable as a varnish oil comprising a simultaneously dehydrated and heat-bodied mixture consisting of castor oil and a neutral allyl ester of a polycarboxylic acid.

13. A product suitable as a varnish oil comprising a simultaneously dehydrated and heat-bodied mixture consisting of castor oil containing from 25% to 90% by weight of a diallyl ester of a dicarboxylic acid.

14. A product suitable as a varnish oil comprising a simultaneously dehydrated and heat-bodied mixture consisting of castor oil and diallyl phthalate.

FRANKLIN A. BENT.
CLYDE R. RYAN.